(12) United States Patent
Singamsetty et al.

(10) Patent No.: US 8,614,963 B2
(45) Date of Patent: Dec. 24, 2013

(54) WIRELESS SYSTEM PROTOCOLS FOR POWER-EFFICIENT IMPLEMENTATION OF STAR AND MESH WIRELESS NETWORKS WITH LOCAL AND WIDE-AREA COVERAGE

(75) Inventors: Suresh Singamsetty, Aliso Viejo, CA (US); Dennis Kwan, San Diego, CA (US); Jeffrey Hsieh, Dove Canyon, CA (US)

(73) Assignee: SilverPlus, Inc., Irvine, CA (US)

( * ) Notice: Subject to any disclaimer, the term of this patent is extended or adjusted under 35 U.S.C. 154(b) by 144 days.

(21) Appl. No.: 13/066,787

(22) Filed: Apr. 25, 2011

(65) Prior Publication Data

US 2011/0305232 A1 Dec. 15, 2011

Related U.S. Application Data

(60) Provisional application No. 61/397,667, filed on Jun. 15, 2010.

(51) Int. Cl.
*G08C 15/00* (2006.01)
*H04J 1/16* (2006.01)
*H04L 12/26* (2006.01)
*H04W 4/00* (2009.01)

(52) U.S. Cl.
USPC ........... 370/252; 370/329; 370/343; 370/350; 370/437

(58) Field of Classification Search
None
See application file for complete search history.

(56) References Cited

U.S. PATENT DOCUMENTS

| | | | |
|---|---|---|---|
| 4,601,043 A * | 7/1986 | Hardt et al. | 375/134 |
| 6,049,561 A | 4/2000 | Pezzlo et al. | |
| 6,731,939 B1 * | 5/2004 | Watanabe et al. | 455/450 |
| 6,754,250 B2 | 6/2004 | Haartsen | |
| 2002/0041622 A1 * | 4/2002 | Steed et al. | 375/132 |
| 2002/0181435 A1 * | 12/2002 | Miklos et al. | 370/348 |
| 2003/0235175 A1 * | 12/2003 | Naghian et al. | 370/338 |
| 2004/0022222 A1 * | 2/2004 | Clisham | 370/338 |
| 2004/0125776 A1 | 7/2004 | Haugli et al. | |
| 2004/0142696 A1 * | 7/2004 | Saunders et al. | 455/450 |

(Continued)

OTHER PUBLICATIONS

"Service Oriented Pervasive Computing for Emergency Response Systems," by Swaroop Kalasapur et al., Proceedings of the Fourth Annual IEEE Int'l Conf. on Pervasive Computing and Communications Workshops, 2006 IEEE, 5 pgs.

(Continued)

*Primary Examiner* — Gregory Sefcheck
*Assistant Examiner* — Ashley Shivers
(74) *Attorney, Agent, or Firm* — Saile Ackerman LLC; Stephen B. Ackerman; Billy Knowles

(57) ABSTRACT

A communication system that allows communication devices to synchronize the transfer of data to allow the devices to wirelessly and efficiently communicate in a star or mesh network. The communication system operates in the presence of other communication systems noise sources using a spread spectrum frequency hopping transmission scheme to efficiently generate adaptive frequency hopping patterns that are unique to the members of the wireless network based on a network identification code. The communication system employs a predictive retrieval of data for transmission from one device storing the data to a requesting device. A communication device transfers communication from a first network to a second network when the device has been moved beyond the range of the first network, where the second network is in communication with at least one other member device of the first network.

41 Claims, 14 Drawing Sheets

(56) References Cited

U.S. PATENT DOCUMENTS

| | | | |
|---|---|---|---|
| 2004/0266404 A1* | 12/2004 | Nasu et al. | 455/414.1 |
| 2005/0046602 A1 | 3/2005 | Hayami | |
| 2005/0132148 A1* | 6/2005 | Arimilli et al. | 711/154 |
| 2005/0187789 A1* | 8/2005 | Hatlestad et al. | 705/2 |
| 2005/0198238 A1 | 9/2005 | Sim et al. | |
| 2006/0025138 A1* | 2/2006 | Kotzin | 455/445 |
| 2006/0094397 A1 | 5/2006 | Raghuram et al. | |
| 2006/0268891 A1 | 11/2006 | Heidari-Bateni et al. | |
| 2006/0280140 A9* | 12/2006 | Mahany et al. | 370/329 |
| 2007/0008925 A1* | 1/2007 | Dravida et al. | 370/331 |
| 2007/0104203 A1* | 5/2007 | Sood et al. | 370/394 |
| 2007/0143043 A1 | 6/2007 | Wafer et al. | |
| 2007/0183338 A1* | 8/2007 | Singh et al. | 370/252 |
| 2007/0197881 A1 | 8/2007 | Wolf et al. | |
| 2007/0211714 A1* | 9/2007 | Metke et al. | 370/389 |
| 2007/0252702 A1 | 11/2007 | Wulff et al. | |
| 2009/0227877 A1* | 9/2009 | Tran | 600/483 |
| 2010/0056157 A1* | 3/2010 | Verona et al. | 455/438 |
| 2010/0295674 A1 | 11/2010 | Hsieh et al. | |
| 2010/0295684 A1 | 11/2010 | Hsieh et al. | |

OTHER PUBLICATIONS

"Channel Assignment Schemes in Wireless Mesh Networks," by Yulong. Chen et al., 2010 IEEE, 978*4244-9003-5/10, 5 pgs.

"Strategies for Adaptive Frequency Hopping in the Unlicensed Bands," by Petar Popovski et al., IEEE Wireless Communications, Dec. 2006, pp. 60-67.

IEEE Standard for information technology-Telecommunications and information exchange between systems- Local and metropolitan area networks-Specific requirements, Part 11: Wireless LAN Medium Access Control (MAC) and Physical Layer (PHY) Specifications, IEEE Std 802.11 TM-2007, (Revision of IEEE Std 802.Nov. 1999), Jun. 12, 2007, Chapter 14, "Frequency-hopping spread spectrum (FHSS) PHY specification," pp. 487-536.

Specification of the Bluetooth System, Master Table of Contents & Compliance Requirements, Covered Core Package version: 4.0, Current Master TOC, Part B—Baseband Specification, Chapters 2 "Physical channels," and 8 "Link Controller Operation," Jun. 30, 2010, pp. 65-96, 150-191.

International Search Report—PCT/US2011/001060 Mail date—Jan. 5, 2012, Silverplus, Inc.

* cited by examiner

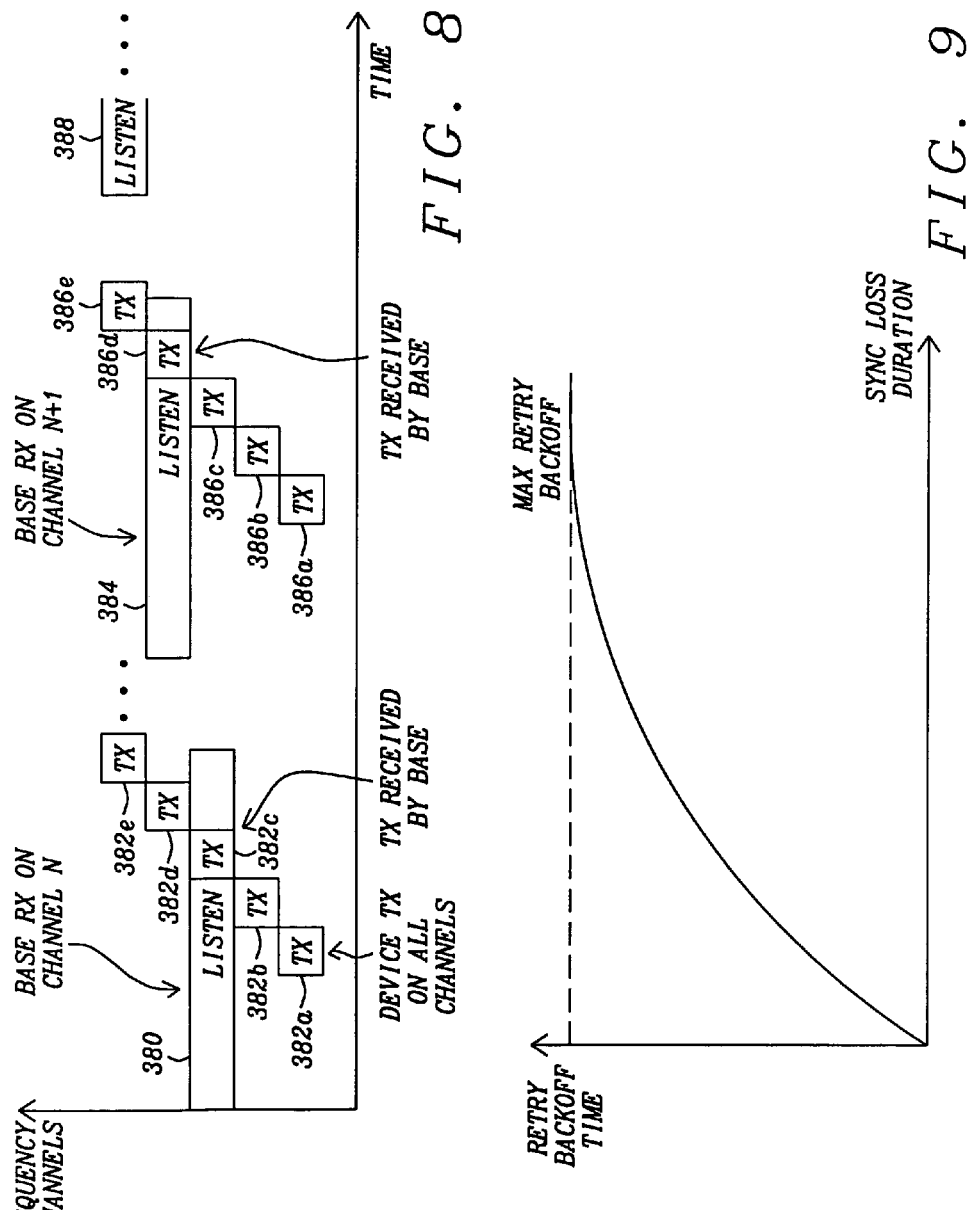

WIRELESS SYSTEM PROTOCOLS FOR POWER-EFFICIENT IMPLEMENTATION OF STAR AND MESH WIRELESS NETWORKS WITH LOCAL AND WIDE-AREA COVERAGE

RELATED PATENT APPLICATIONS

This application claims benefit under 35 U.S.C. §119 to U.S. Provisional Patent Application Ser. No. 61/397,667, filed on Jun. 15, 2010, assigned to the same assignee as the present invention, and incorporated herein by reference in its entirety.

U.S. patent application Ser. No. 12/454,714, filed on May 21, 2009, assigned to the same assignee as the present invention, and incorporated herein by reference in its entirety.

U.S. patent application Ser. No. 12/454,715, filed on May 21, 2009, assigned to the same assignee as the present invention, and incorporated herein by reference in its entirety.

BACKGROUND OF THE INVENTION

1. Field of the Invention

This invention relates generally to a wireless digital communications system and control of a wireless network having battery operated communication devices.

2. Description of Related Art

Short-range wireless networks consist of communication devices such as portable media players, personal communication devices such as mobile phones, digital monitoring devices, etc. These communication devices are generally configured in networks structured as a star network or a mesh network. In a star network, a central computer or hub controls the communication between the communication devices connected to the remote nodes of the star. In a mesh network, each communication device is communicates with any or all of the other communication devices in the network. Each communication device can act a router of information between the communication devices.

Typically, the networks comply with network protocols defined in specifications such as Bluetooth or the IEEE 802.11. These specifications provide: Data formats for data exchange; Address formats for data exchange; Address mapping; Routing; Detection of transmission errors; Acknowledgements of correct reception of packets; Loss of information—timeouts and retries; Sequence control; Flow control; and syntax and semantics of the communications. Further, these protocols employ spread spectrum frequency hopping techniques for transmitting the data to provide secure communications by increasing resistance to natural interference and collisions with other transmitters within the reception area. Synchronization to the hopping sequence is required for communication devices to be able to transmit and receive the communicated between them. It has always been a challenge to achieve fast synchronization while keeping the power consumption low for wireless system protocols. All existing frequency hopping standard protocols such as used by Bluetooth and IEEE802.11, do not achieve this very well. In the case of Bluetooth, low-power is achieved at the expense of very long acquisition time very often in the order of seconds in practice. For 802.11, power consumption is always high to allow synchronization to be much faster than Bluetooth.

The ISM (industrial, scientific and medical) radio bands were originally reserved internationally for the use of RF energy for industrial, scientific and medical purposes other than communications, such as radio-frequency process heating, microwave ovens, and medical diathermy machines. The powerful emissions of these devices can create electromagnetic interference and disrupt radio communication using the same frequency, so these devices were limited to certain bands of frequencies. In general, any communications equipment operating in these bands must accept any interference generated by ISM equipment. For interference avoidance in the 2.4 GHz ISM band, Bluetooth has a very complex adaptive hopping scheme that constructs a channel list to which the system would hop. This requires a large amount of overhead in communicating the information, as well as creating and maintaining the list, leading to further power consumption.

A further problem exists with the portable devices operating in the 2.4 Ghz ISM band. These wireless devices lose their connectivity once out of range. Wide-area networks such as GSM (Global System for Mobile Communications) or other cellular systems are not power efficient enough to support battery life for months and therefore is not suitable for communication devices such as portable and/or wearable health management systems.

SUMMARY OF THE INVENTION

What is needed is a communications system having the ability to communicate reliably and securely within radio communication bands such as the ISM band. Further, what is needed is a mechanism for handing off communications from a wireless local area network (WLAN) to a wide area wireless system such as a cellular telephone system, when one of the devices communicating with the WLAN is moved out of the range reception of the other devices of the WLAN.

An object of this invention is to provide a communication system that allows communication devices to synchronize the transfer of data to allow the devices to wirelessly and efficiently communicate in a star or mesh network.

Another object of this invention is to provide a communication system operating in the presence of other communication systems noise sources using a spread spectrum frequency hopping transmission scheme to efficiently generate adaptive frequency hopping patterns that are unique to the members of the wireless network.

Another object of this invention is to provide a communication system employing a predictive retrieval of data for transmission from a device at a communication node storing the data to a requesting device at another node of the communication system.

Further, another object of this invention is the transfer of communication for a device from a first network to a second network when the device has been moved beyond the range of the first network, where the second network is in communication with at least one other member device of the first network.

To accomplish at least one of these objects, in various embodiments, a communication system has multiple communication devices. Each of the communication devices is in communication with other communication devices through a wireless network. The communication devices include a first type of communication device that is a control communication device, a second type of communication device that is human interface device to allow a person to request and receive services from other devices on the communication network, and a third type of communication device on the communication device is a service communication device to perform services, with the services being transferring data and voice and activating devices such as lights and alarms, telephones, or controlling other electrical and mechanical devices.

If the wireless network is configured as a star network, all the communication devices communicate with one control communication device and the communication devices communicate with each other through the control communication device. In some embodiments, the wireless network functions as a mesh network where each communication device communicates directly with other communication devices within the network. The network is assigned a network identification code that identifies the network and differentiates the network from other networks of communication devices. The control communication device is assigned a unique network identification code that allows each of the communication devices to communicate with the control communication device. A common access network identification code is assigned to service communication devices connected to the network to provide special services to requesting human interface communication devices on the network. In various embodiments, examples of the service communication devices are a light activation device and a communication network extender that allows the person to communicate with the network when out of range of the other communication devices in the network. A device identification code is assigned uniquely to each of the communication devices and is used in conjunction with the network identification code and the common access identification code for filter data packets that are addressed to receiving device.

In some embodiments, each of the communication devices has a channel hopping control device that receives the network identification code. The network identification code is used to select a grouping of frequency channels within a radio frequency communication band for transmitting data between devices within a network of the communication devices. The channel hopping control device further uses network identification code as a seed for a pseudorandom generation of a channel hopping sequence of the selected channels.

In certain embodiments, the channel hopping control apparatus has a received signal strength indicator circuit to determine which of the frequency channels within a radio frequency communication band are acceptable for communicating between the communication devices within the network.

In various embodiments, the communication device has a synchronizing word generator that incorporates the network identification code or the common access network identification code to generate a timing synchronizing word within a data packet for insuring synchronization of the communication devices within network.

In various embodiments, the communication device uses the common access identification code to communicate with other devices within a network to which the communication device is not a member to request to join the network. The control communication device of the network transmits the network identification code, a time stamp, and a timing offset to the requesting communication device and the requesting device employs the identification code to generate the grouping of frequency channels used by the network and the frequency hopping sequence. The communication devices transmits request to join messages sequentially on each of the frequency channels of the radio frequency communication band and waits for the control communication device to receive and respond to one of the request to join messages on a channel that the control communication device is monitoring.

In some embodiments, some types of communication devices use the common access identification code in conjunction with the network identification code to receive a request to perform a service. The service may be activating an electrical or mechanical device such as a light, alarm, or telephone.

In a number of embodiments, the communication device requests data from another device and the other device transmits a bitmap to the requesting communication device. The data transmitting device retrieves the data from a slow storage medium with a large latency and predictively stages the data pending requests from the requesting device.

In certain embodiments, the communication device has a power supply control circuit that places the communication device in a sleep mode to minimize power consumption. The power supply control periodically activates the communication device to receive a beacon signal from a controlling communication device on the network. If the communication device does not have any data to receive, the communication is returned to the sleep mode. If the communication device is to receive data, it transmits a ready-to-receive message to the controlling device. The control communication device transmits a data offset and length. The communication device then transmits a request for portions of the data based on the data offset and length.

If the communication device does not receive the beacon, it attempts to resynchronize with the network at an increased frequency. If the communication device is resynchronized, it receives and transmits data until a communication task is complete. If the communication device is not resynchronized, it will return to the sleep mode for a period of time and then retry to resynchronize. If the communication device is repeatedly not resynchronized, the time that the communication device is in the sleep mode is extended until the communication has not been synchronized for unsynchronized time limit. At which time, the device will maintain the sleep mode for the unsynchronized time limit.

In other embodiments, if the communication device is repeatedly not synchronized or an emergency occurs, the communication device will attempt to communicate with the control communication device through a wide area wireless system. When the communication device becomes resynchronized to the first network, the communication device maintains communication with the second network for a period of time to insure that the synchronization is relatively secure.

In some embodiments, the communication device includes a motion detector. If the communication device is unsynchronized and has not been in motion for a period of time, the communication device is placed in the sleep mode for the unsynchronized time limit, until the motion detector determines that the communication device has been moved.

In certain embodiments, the communication device includes a proximity monitor that determines if the communication device is in sufficiently close proximity to other communication devices that are members of the network to maintain synchronization. If the communication device is not sufficiently close, the communication will assume the sleep mode, unless there is an emergency. If there is an emergency, the communication device will activate and attempt resynchronization. If resynchronization does not occur, the communication device will activate the second network to communicate the emergency to the control communication device of the first network.

In various embodiments, the data is transmitted on the network of communication devices as data packets. The data packets comprise an access code containing at least a preamble and a synchronizing word and a header having a sending communication device identifier field and a destination communication identifier field. The sending communication device identifier field and a destination communication identifier field further contain a device identification code and the unique network identification code or the common access network identification code. The communication device further comprises as packet filter. The packet filter examines the header of each packet that is received by the communication device and accepts those packets with destination communication identifier fields that are designated for the communication device. If the destination communication identifier field is not designated for the communication device, the packet is discarded.

In various embodiments, the second type communication device is a wearable health management device and the control communication device is a base station controlling other wearable health management devices connected to the network. In some embodiments, the third type communication device is a switching device to activate and deactivate equipment such a lights or emergency sounding devices. In some embodiments, the third type communication device is a network extender device to provide a range extension for the second type communication devices that have moved beyond the range of the control communication device. In other embodiments, the third type communication device is a telephone with a microphone and speaker for transmitting and receiving sounds such as speech. The data is encoded speech and is transmitted isochronously. In some embodiments, the second network is a wide area wireless network such as a cellular telephone network.

In other embodiments, a method and apparatus for synchronizing communication devices in wireless network transmitting and receiving data on multiple frequency channels within a radio frequency communication band using a spread spectrum frequency hopping technique begins by selecting a set of the multiple frequency channels. The channels are selected by those channels having a greater received signal strength indicator and from those selected channels a number of channels designated for the network are chosen based on a mapping function of a network identifier code. The network identifier is used as a seed for a pseudorandom number generator to choose an order of the frequency hopping of the selected channels chosen for the network.

In various embodiments, a method and apparatus for one communication device to join a network of communication devices begins by the one communication device transmitting a request to join the network employing a common access network identifier code on each channel of the multiple frequency channels within a radio frequency communication band. A control communication device receives the request to join and transmits the network identifier code, a time stamp and a timing offset for determining the selected channels and their sequence for communicating on the network. The one communication device receives the network identifier code, the time stamp, and the timing offset and joins the network using the network identifier code and the timing offset.

If the control communication device does not accept the one communication device, a trial count is incremented. The trial count is compared with a trial limit. If the trial limit is not exceeded, the one communication device transmits the request to join. The request to join is transmitted until the control communication device accepts the one communication device and transmits the network identifier code and timing offset or trial limit is exceeded. If the trial limit is exceeded, the attempt to join is terminated.

In other embodiments, the control communication device determines a spread spectrum of frequency channels for a network of communication devices by determining a receiver signal strength indicator (RSSI) for each channel of the communication band on which the network of communication devices are communicating. Those channels of the communication band with the lowest RSSI are deselected. A subset of the remaining channels with the highest RSSI is selected as mapped from the network identifier code. The mapping function of the network identifier code is a linear function or a nonlinear function. The subset of the channels of the communication band provides a frequency diversity to prevent interference of the network from nearby networks or noise sources.

In some embodiments, the frequency hopping order of the selected subset of channels is determined by a pseudorandom number generator. The seed for the pseudorandom number generator is the network identifier code. The pseudorandom ordering of the subset of channels provides frequency diversity for the selected subset of channels to further prevent interference from the nearby networks or noise sources. In some embodiments, there are 256 channels available within the communication band of which sixteen of these channels are chosen for the network of communication devices.

In various embodiments, a method and apparatus for filtering data packets begins by reading an address field of the received packet. If the address field has a common access identifier code, the packet is automatically accepted for reading and processing. If the address field has a network identifier code, the address packet is further examined to determine if the destination address is for the device identifier code for the receiving communication device. If the destination address is for the device identifier code for the receiving communication device, the packet is accepted for reading a processing. If the destination address is not for the device identifier code for the receiving communication device, a control field is examined to determine if the packet is be forwarded to another communication device. If the packet is not to be forwarded, it is discarded. If the packet is to be forwarded, it is accepted for reading and processed for forwarding to the other communication device. If more packets are received, the next packet is access and filtered. If no more packets are received, the process is ended.

In various embodiments, a method of operating a communication device within a network of communication devices, energy is conserved by placing the communication device in a sleep mode when there is no data to transmitted or received. The communication device periodically wakes from the sleep mode and receives a beacon transmitted by the controlling device of the network of communication devices. The beacon contains information describing if any data is to be transmitted or received by the communication device. If the communication device is not to receive or transmit data, the communication is returned to the sleep mode. If the communication device is to receive or transmit data, the data is appropriately received or transmitted.

BRIEF DESCRIPTION OF THE DRAWINGS

FIG. 8 is a plot of channel frequency versus time for a communication device to join a communication network according to the method of FIG. 6

FIG. 9 is a plot of retry backoff time versus synchronization loss duration of a communication device to conserve energy when the communication device is unable to achieve synchronization with the communication network.

DETAILED DESCRIPTION OF THE INVENTION

Figure 1A:
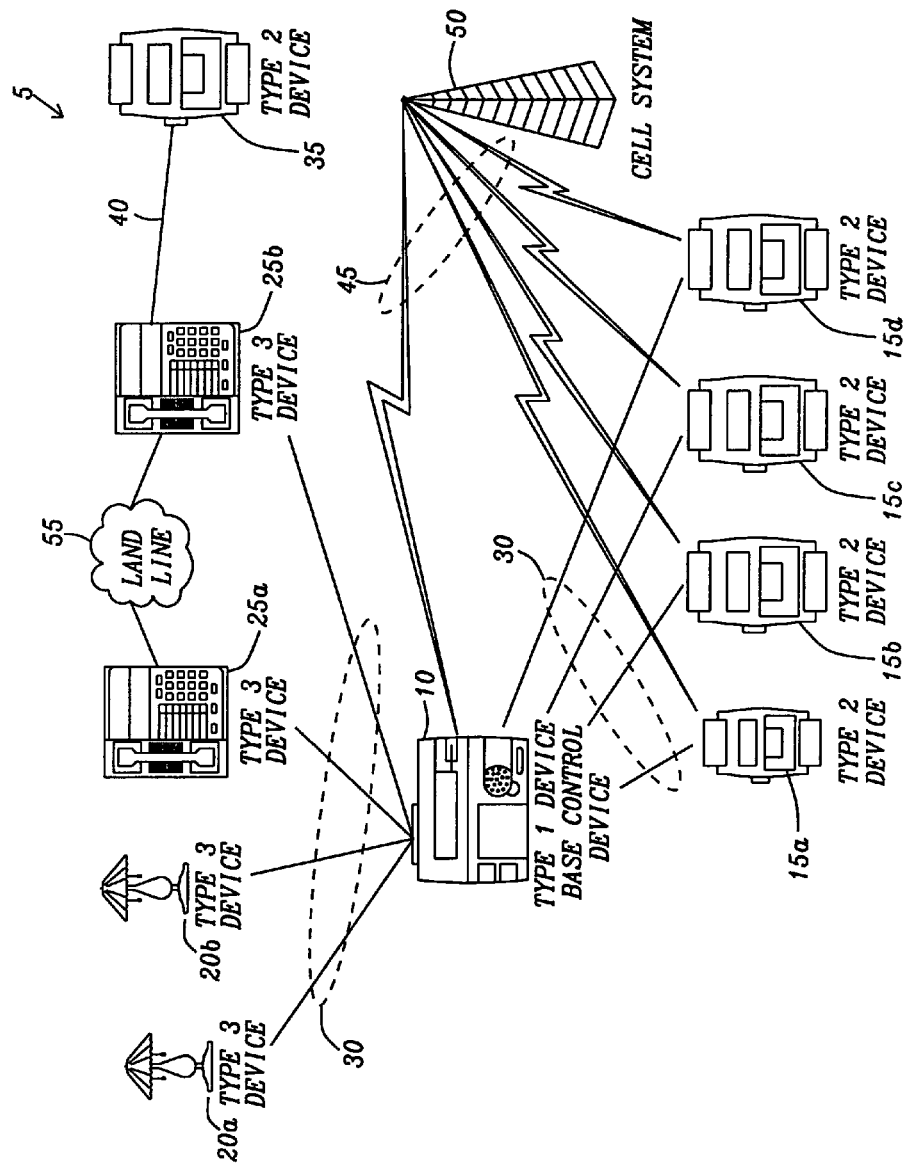
FIG. 1a is a diagram of an embodiment of a communication network.
Figure 1B:
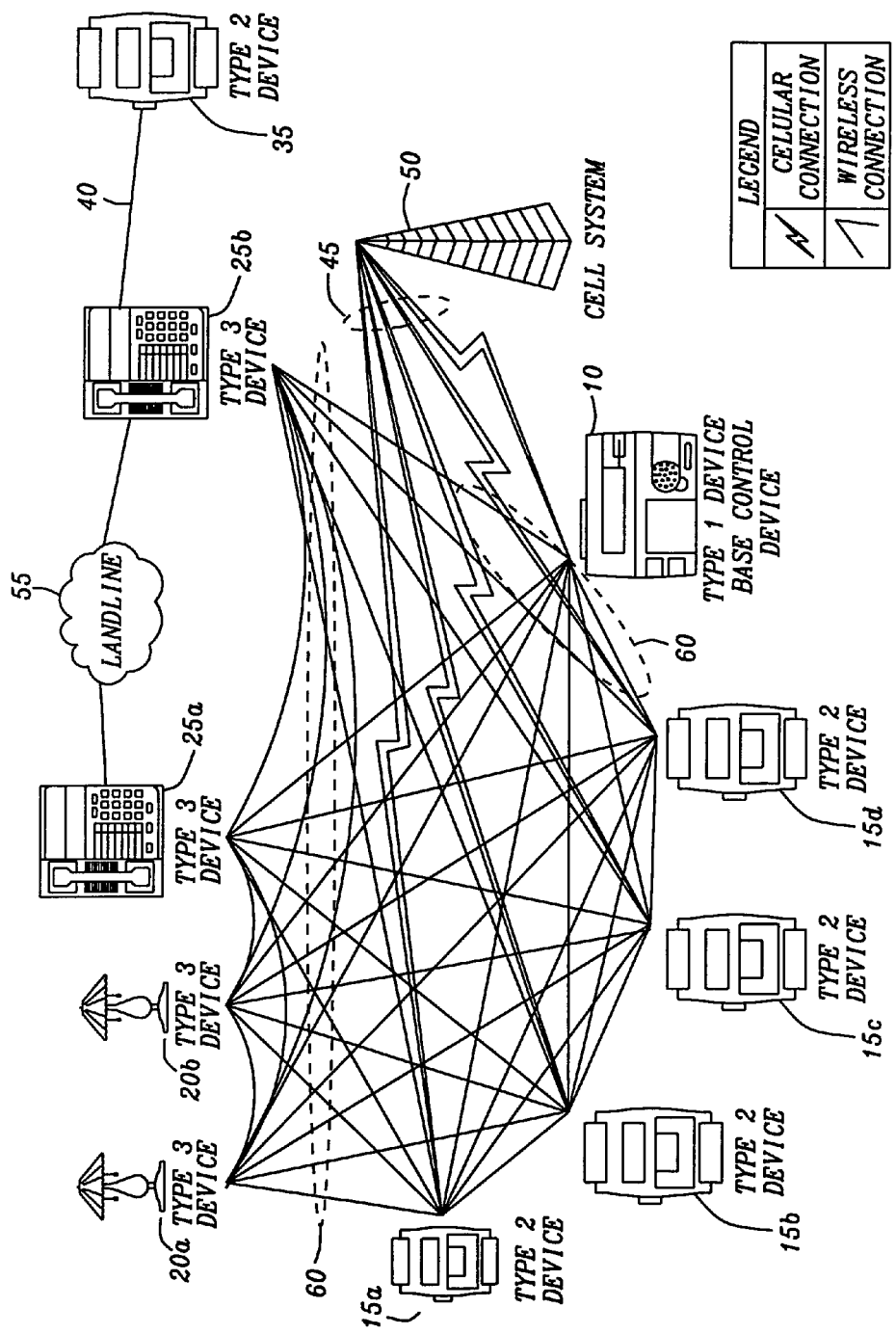
FIG. 1b is a diagram of an embodiment of a communication network.

For this invention, portable and/or wearable health management systems include personal emergency response systems, telehealth, and telemedicine systems. The personal emergency response systems allow users to send an alarm signal to a remote base station to alert caregivers to request assistance in an emergency. These normally consist of a mobile device wirelessly connected to a console, which communicates to caregivers via voice calls over standard analog telephone lines. The telehealth and telemedicine systems are for measurements and monitoring of users' health information, such as their vital signs. These are normally connected to remote caregivers using data, over the Internet or just using modems over analog telephone lines. The portable and/or wearable health management system such as watch or pendant as described in the 714 and 715 patent applications are health management communication devices 15*a*, 15*b*, 15*c*, and 15*d* as shown in FIGS. 1*a* and 1*b*. The console of the 714 and 715 patent applications is the base control communication device 10. In some embodiments of this invention, the health management communication devices 15*a*, 15*b*, 15*c*, and 15*d* and the base control communication device 10 further communicate with service communication devices 20*a* and 20*b* and 25*a* and 25*b* such as lights and sound transducers. In the embodiments of this invention, the health management communication devices 15*a*, 15*b*, 15*c*, and 15*d* and the service communication devices 20*a* and 20*b* and 25*a* and 25*b* are connected to the base control communication device 10 in a star configuration. However, the health management communication devices 15*a*, 15*b*, 15*c*, and 15*d* and the service communication devices 20*a* and 20*b* and 25*a* and 25*b* are able to communicate, in some embodiments, in a mesh configuration.

FIGS. 1*a* and 1*b* are diagrams of an embodiment of a communication network configured as a star network and a mesh network. FIG. 1*a* illustrates the star network 5 where a first type of communication device functions as the base control communication device 10. The base control communication device 10 determines the network channels within the frequency band on which the communication network 5 operates. Further, the base control communication device 10 determines a hopping sequence for the network channels by which the network communication functions. The base control communication devices 10 communicate with a second type of communication devices that is the health management communication device 15*a*, 15*b*, 15*c*, and 15*d* and a third type of communication device that is the service communication devices 20*a* and 20*b* and 25*a* and 25*b* through the wireless network 30. The wireless network 30 operates on frequency bands such as the unlicensed 2.4 GHz ISM (Industrial Scientific Medical) band.

The health management communication device 15*a*, 15*b*, 15*c*, and 15*d* is a human interface device that in some embodiments allows a person to request and receive services from other devices communicating on the communication network 30. The human interface device 15*a*, 15*b*, 15*c*, and 15*d* in various embodiments is a personal health management device for providing measurements and monitoring of users' health information, such as their vital signs and in an emergency alerting emergency services and contact persons for the person having the human interface device 15*a*, 15*b*, 15*c*, and 15*d*. Further, the human interface device 15*a*, 15*b*, 15*c*, and 15*d* allows the person to receive voice and data communications such voice conversations with other persons on the network or reminders for appointments or the taking of medication.

The third type of communication device 20*a* and 20*b* and 25*a* and 25*b* performs services for activating and deactivating equipment such a lights or emergency sounding devices. In some embodiments, the third type communication device 25*a* and 25*b* is a network extender device to provide a range extension for the human interface device 35 devices that have moved beyond the range of the control communication device 10 and is in communication with the network 30 through a second network 40 that communicates with second set of channels in the frequency band. In other embodiments, the third type communication device 25*a* and 25*b* is a telephone connected to a land line 55 that is connected to a public switched telephone network (PSTN) or voice over internet protocol (VOIP) network. The third type of communication device 25*a* and 25*b* has a microphone and speaker for transmitting and receiving voice which is transmitted isochronously on the network 30.

When any of the human interface devices 15*a*, 15*b*, 15*c*, 15*d* or 35 are out of the range of the network 30 and must transmit a priority or emergency message, the human interface device 15*a*, 15*b*, 15*c*, 15*d* or 35 communicates with a wide area wireless system such as a cellular system 50. The human interface device 15*a*, 15*b*, 15*c*, 15*d* or 35 attempts to reestablish communication with the base control communication device 10 a number of times and then activates the cellular communication to communicate the emergency or priority message to the base control communication device 10 or other designated destination for the message.

In FIG. 1*b*, the base control communication device 10 controls the network protocol such as the network channels and the hopping sequence for the network channels but in this case each of the human interface devices 15*a*, 15*b*, 15*c*, and 15*d*, the service devices 20*a* and 20*b* and 25*a* and 25*b* are able to communicate with each other in a mesh configured network 60.

In the star network of FIG. 1*a* and the mesh network of FIG. 1*b*, the network has its one network identification code that is used by the base control communication device 10 for the selection and generation of the network channels. The network identification code (NID) further is used for the filtering of packets received by base control communication device 10, the human interface devices 15a, 15b, 15c, and 15d, and the service devices 20a and 20b and 25a and 25b. The base control communication device 10 has its own unique network identification code (UNID) that is use for communication by the human interface devices 15a, 15b, 15c, and 15d and the service devices 20a and 20b and 25a and 25b to communicate with the base control communication device 10. A common access network identification code (CANID) is assigned to the network to allow the base control communication device 10 and the human interface devices 15a, 15b, 15c, and 15d and the service devices 20a and 20b and 25a and 25b to communicate with each other, such that the human interface devices 15a, 15b, 15c, and 15d to request services from the service devices 20a and 20b and 25a and 25b. The CANID code is also employed by a new device or an existing device to request to join or rejoin the network. Each of the devices, the base control communication device 10, the human interface devices 15a, 15b, 15c, and 15d, and the service devices 20a and 20b and 25a and 25b has its own device identification code (DID) that is used in combination with the NID code and/or the CANID code for communicating data between the base control communication device 10, the human interface devices 15a, 15b, 15c, and 15d, and the service devices 20a and 20b and 25a and 25b.

Figure 2:
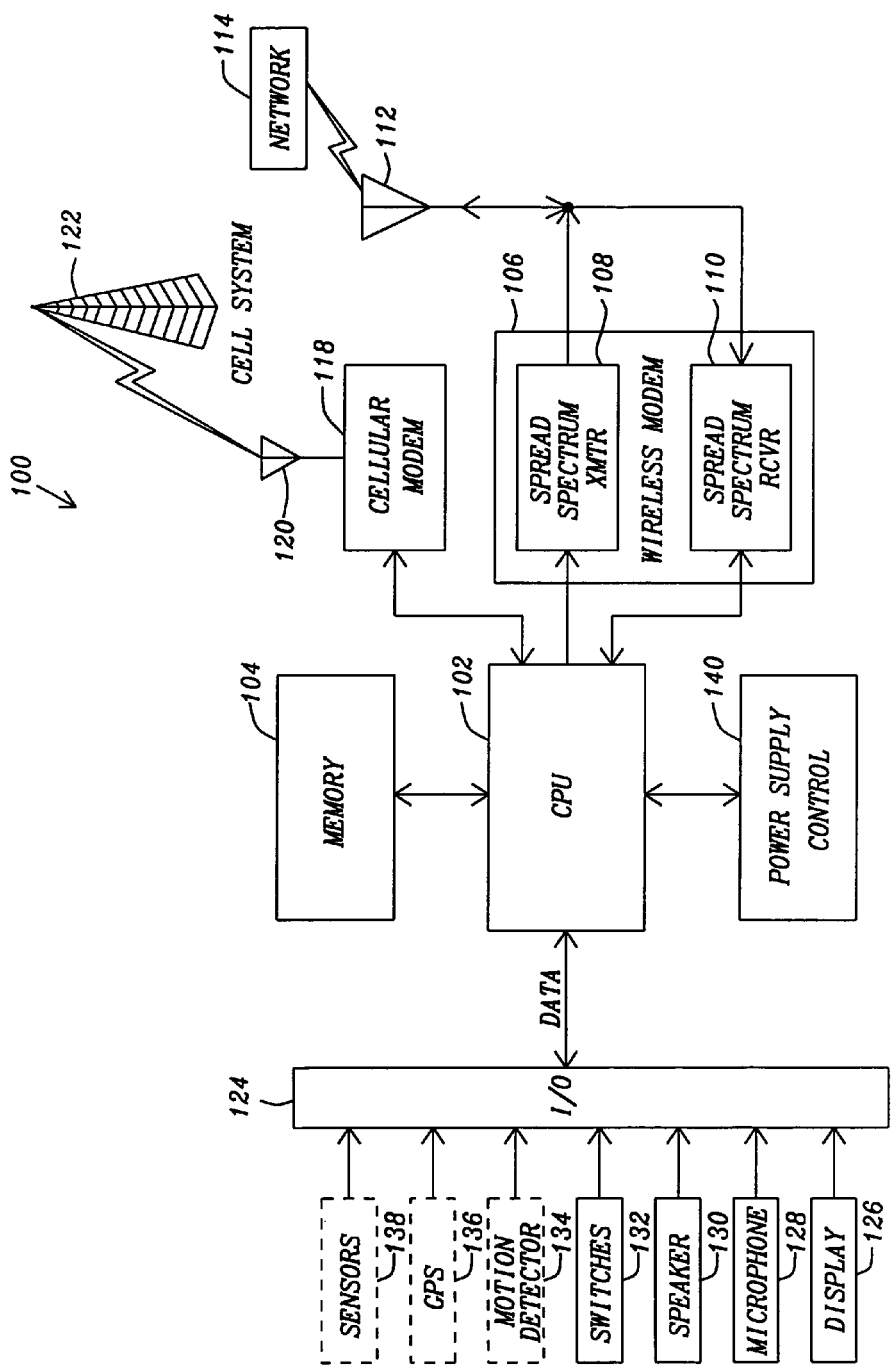
FIG. 2 is a block diagram of an embodiment of a communication device connected to a communication network.

FIG. 2 is a block diagram of an embodiment of a communication device 100 connected to the communication networks 114 and 120. In some embodiments, the communication device 100 is the base control communication device 10. In other embodiments, the communication device is the second type of communication devices 15a, 15b, 15c, and 15d. In still other embodiments, the communication device 100 is the third type of communication devices 20a and 20b and 25a and 25b. The communication device 100 has a microprocessor connected to a local area wireless network modem 106 and a wide area wireless modem 118 such as a cellular modem. The central processing unit (CPU) 102 is connected to a memory 104. The memory 104 retains the computer executable code that executes the processes for controlling the operation of the communication device. In the embodiments of the human interface device 15a, 15b, 15c, 15d or 35 of FIGS. 1a and 1b, the communication device 100 will be worn or attached to the person operating the communication device and will be portable, such a watch or pendant. In the embodiments where the communication device 100 is worn or portable, the communication device 100 will implement processes for conserving energy within an included battery. Therefore, the CPU 102 is connected to a power supply control circuit 140 that will provide the timing for the activation and deactivation of the communication device 100.

The CPU 102 is connected to an Input/Output Interface (I/O) 124. The I/O Interface 124 provides the buffering and signal conditioning for signals from I/O devices included in the communication device 100. The I/O devices include such devices as a display 126 for showing alphanumeric and graphic information (including current time), a microphone 128 and a speaker 130 for voice communication, various push-button switches 132. The switches 130 provide a user interface to support functions including emergency alert one-touch access to 911 services, a favorite help button for contacting personal care and significant personnel, one-touch connection to other devices in the network such as the base control communication device 10 of FIGS. 1a and 1b, and commanding services from the service devices 20a and 20b and 25a and 25b of FIGS. 1a and 1b. Optional interface devices include a motion detector 134 to determine if the communication device 100 is moving, a global positioning system (GPS) unit 136 for determining the location of the communication device 100, and any other sensors 138 such as health monitoring devices. The I/O devices, when activated, transfer data to the CPU 102 which retrieves the computer code to execute an appropriate process indicated by the device activated. When communication to other communication devices within the network the CPU 102 activates the spread spectrum receiver 110 of the wireless modem 106 is determine that the communication device 100 is in communication with at least the control communication device 10 of FIGS. 1a and 1b. The spread spectrum transmitter 108 is then activated for communicating with the network 114. For instance if a switch 132 indicating that a light switch is be activated to turn on a light, the communication device 100 transmit a command to another communication device 100 connected to a light. The other communication device 100 receives the command and activates the light. The spread spectrum transmitter 108 and the spread spectrum receiver 110 are connected to an antenna 112 that radiates radio frequency signals to the other communication devices 100 on the network 114.

If the communication device 100 is not able to join or resynchronize with the network 114 or an emergency has occurred, the CPU 102 activates the cellular modem 118 and communicates through the antenna 120 to the wide area wireless system or cellular system 122. The cellular communication is generally reserved for emergency or urgent messages.

Figure 3:
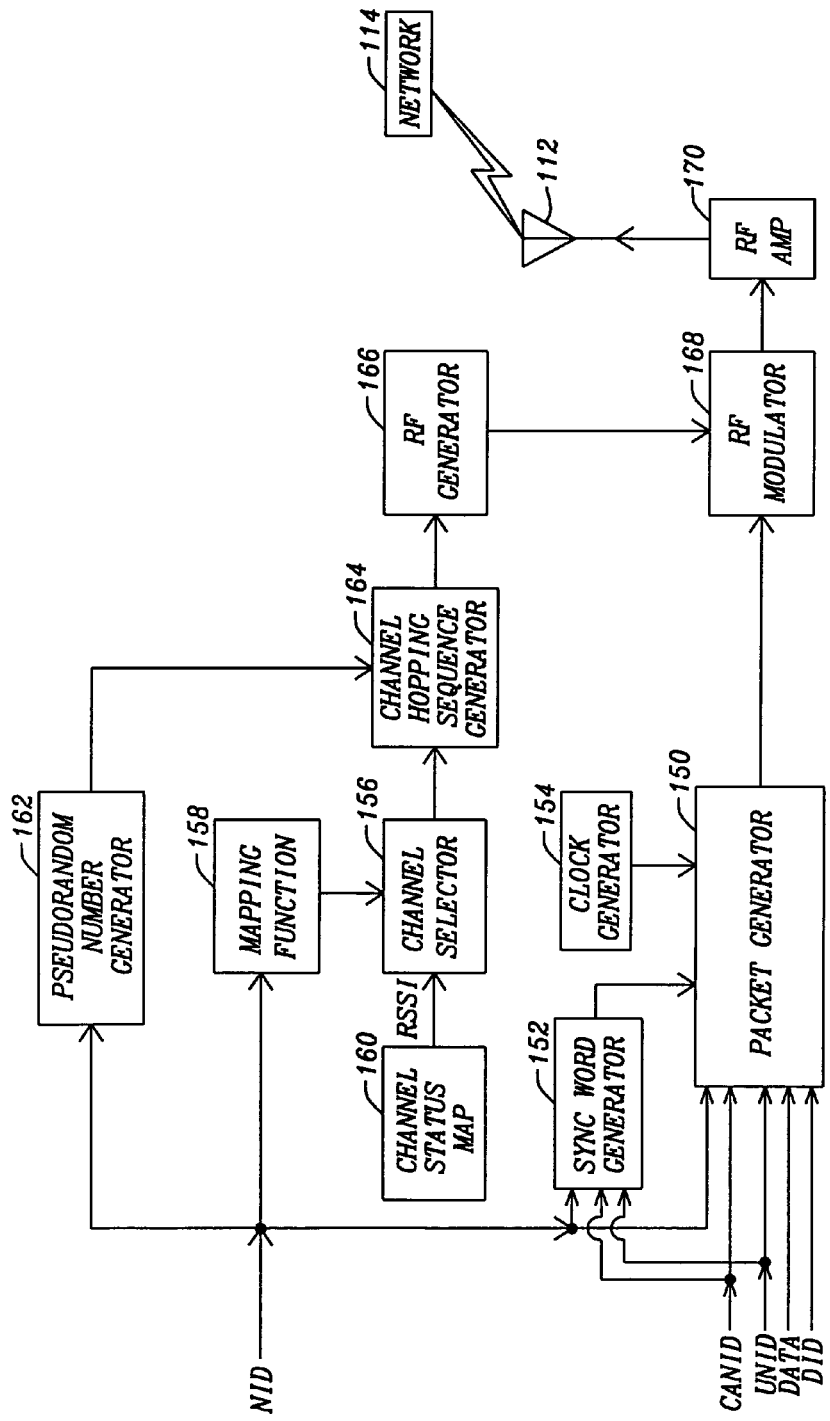
FIG. 3 is a block diagram of an embodiment of a communication transmitting circuit of the communication device of FIG. 2.
Figure 5:
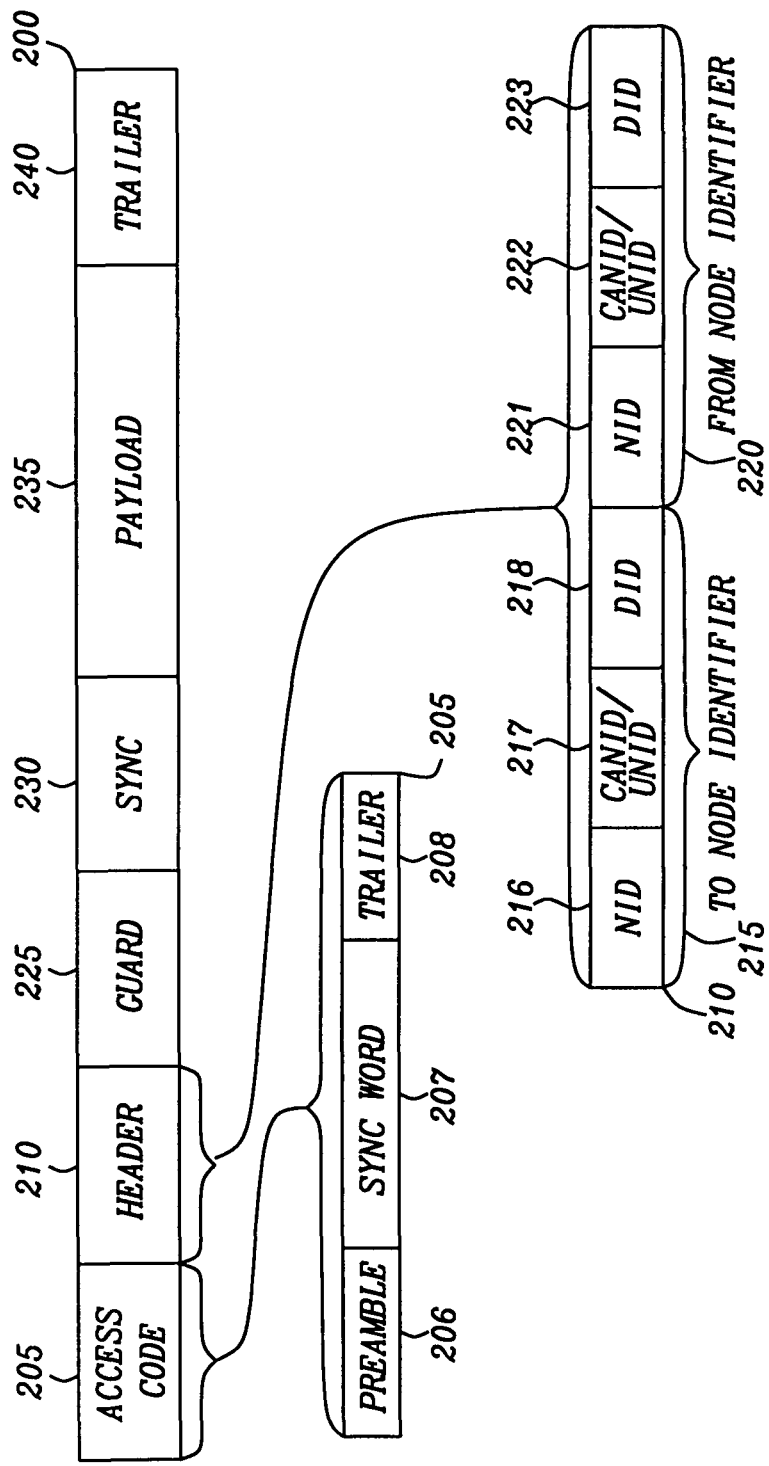
FIG. 5 is a diagram of an embodiment of a packet structure of a communication network of this invention.

FIG. 3 is a block diagram of an embodiment of a spread spectrum communication transmitting circuit 108 in the wireless modem 106 of the communication device 100 of FIG. 2. The message structure of the wireless network is a packet structure that is essentially as shown in FIG. 5. Referring to FIG. 5, in various embodiments, the message packet 200 has an access code 205. The access code 205 is formed of a preamble 206, a synchronization word 207, and a trailer segment 208. The preamble 206, in various embodiments, is a fixed zero-one pattern used to facilitate DC compensation of the transmission. Following the preamble is a synchronizing word 207. The synchronizing word 207 is derived from the NID and the CANID or UNID and is used to improve the timing acquisition of the transmitted message by a receiver. The trailer segment is a fixed zero-one pattern of four symbols that with the synchronizing word 207 form a pattern of alternating ones and zeros which can be used for extended DC compensation.

Following the Access Code 205 is a header 210. The header 210 has two segments that provide the destination node identifier codes 215 and the source identifier codes 220. The destination node identifier codes 215 and the source identifier codes 220 each contain the NID 216 and 221, either the UNID or the CANID 217 and 222. The UNID is for communication with the base control communication device 10. The CANID allows peer-to-peer communication between the human interface devices 15a, 15b, 15c, and 15d, and the service devices 20a and 20b and 25a and 25b of FIG. 1b. The DID 218 and 223 identifies the specific device receiving the communication and the specific device transmitting the communication. Further, the header 210 has other link control information such as packet type code, a flow control code, an acknowledge indication, a sequence number for ordering data in the transfer of the packets, and a header error check.

After the header 210 is the guard segment 225. The guard segment 225 provides a gap between the header 210 and a synchronizing sequence 230. In some embodiments, the access code 205 and the header 210 are transmitted in a Gaussian Frequency Shift Keying (GFSK) and the Payload 235 and the trailer 240 are transmitted in a Differential Phase Shift Keying (DPSK). The guard segment 225 allows the transition between the modulation schemes. Following the guard segment 225 is the synchronizing sequence 230. The synchronizing sequence 230 provides a number of DPSK symbols and consists of a reference symbol (with arbitrary phase) followed by additional DPSK symbols.

After the synchronizing sequence 230, the data payload 235 provides the data being transmitted. In some embodiments, the data may be commands for activation of a service in another of the communication devices, data for display or transmission as voice. The trailer 235 follows the data payload 235 and in some embodiments provides an error correction or a cyclic redundancy code (CRC) for determining if any errors have occurred. In other embodiments, the trailer provides a symbol indicating the end of the payload 235.

Returning to FIG. 3, the spread spectrum communication transmitting circuit 108 has a packet generator 150 that receives the NID, the CANID, the UNID, the incoming data, and the DID to generate the packets that are to be transmitted. The synchronizing word generator receives the NID, the CANID, and the UNID to generate the synchronizing word 207 of FIG. 5. The clock generator 154 is connected to the packet generator 150 to provide the timing for generating the synchronizing word 207.

For generating the radio frequencies necessary for transmitting the data packets, the channel selector 156 selects the frequency channels used within the radio band. The channel status map 160 provides the receiver signal strength indicator (RSSI) for each of the channels of the radio band. The NID is an input to the mapping function circuit 158. The mapping function circuit 158 provides the selection rules for determining the frequency channels. The channel status selector 160 selects those frequency channels having the highest RSSI and from the rules provided by the mapping function circuit 158, the channel selector 156 determines which channels are being used for the spread spectrum transmission. The NID provides a seed for a pseudorandom generator 162 for generating a set of selection numbers used to order the frequency hopping sequence of the frequency channels.

The output of the channel selector 156 and the pseudorandom number generator are combined in the channel hopping sequence generator 164 to provide the channel hopping sequence to the RF generator 166. The radio frequency output of the RF generator modulates the data packet output of the packet generator 150 in the radio frequency modulator 168. The modulated RF signal is transferred to an RF amplifier 170 for transmission through the antenna 112 to the network 114.

Figure 4:
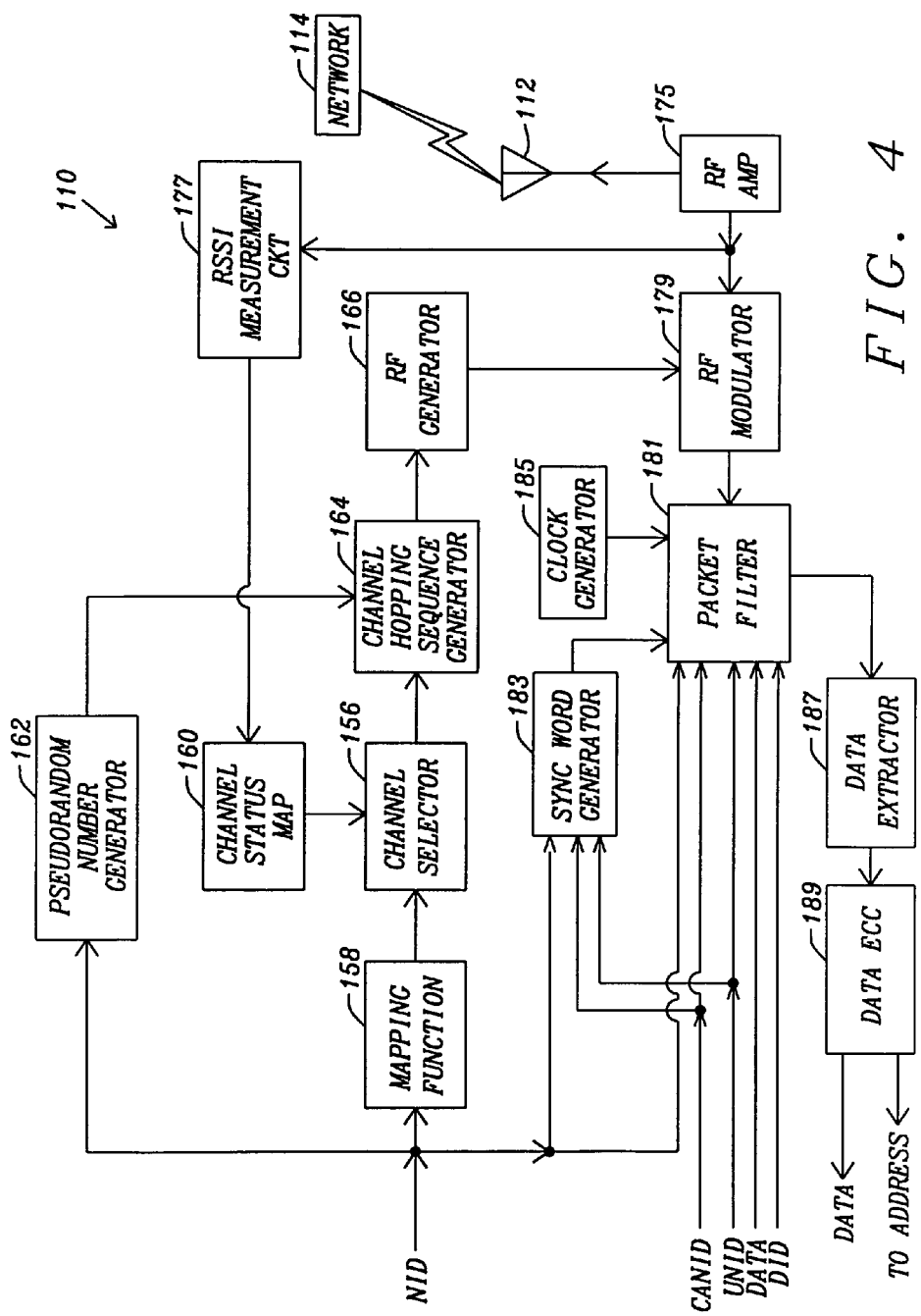
FIG. 4 is a block diagram of an embodiment of a communication receiving circuit of the communication device of FIG. 2.

FIG. 4 is a block diagram of an embodiment of a spread spectrum communication receiving circuit 110 of the communication device 100 of FIG. 2. RF signals are received from the network 114 by the RF receiver 175 through the antenna 112. The output of the RF receiver 175 is transferred to the RSSI measurement circuit 177. The RSSI measurement circuit 177 determines the receiver signal strength indicator for each of the frequency channels of the radio frequency band. The RSSI indicator for each channel is transferred to the channel status map 160. As described for the spread spectrum communication transmitting circuit 108, the NID is used for selecting the channels based on the mapping function circuit 158 selection and the channel status map 160. The channel selector 156 selects the channels with the lowest RSSI factor and from those channels the mapping function based on the NID selects the channels to be monitored. The NID again acts as the seed for the pseudorandom number generator 162 which generates a set of pseudorandom numbers that are used by the channel hopping sequence generator for selecting the frequency hopping sequence. The frequency hopping sequence is the input to the RF generator 179 that generates the RF frequencies for demodulating the input RF signals. The demodulated signals from the RF demodulator 179 are now the data packets that are applied to the packet filter 181.

The NID, the UNID, the CANID, and the DID are applied to the packet filter 181 to determine if the received packets are to be accepted by the packet filter 181. The accepted packets are transferred to the data extractor 187 which extracts the data and the destination address. The destination address is used for such devices as the network extender device 25a and 25b that transfers the packets to communication devices 35 that are beyond the range of the base control communication device 10 of FIGS. 1a and 1b. The extracted data and the destination address is passed to the error detection and correction device 189 where the appended ECC and/or CRC codes are used to detect and/or correct any errors that occur in the data during transmission.

In various embodiments, many of the functions as described in FIGS. 2, 3, and 4 are implemented as program processes executed on the CPU 102 of FIG. 2 and therefore are stored as computer executable code in the memory 104 or any other computer readable medium. In other embodiments, the functions of FIGS. 2, 3, and 4 are implemented as electronic circuitry. In still other embodiments, the functions may be implemented as a mixture of program process executed on the CPU 102 or electronic circuitry.

Figure 6:
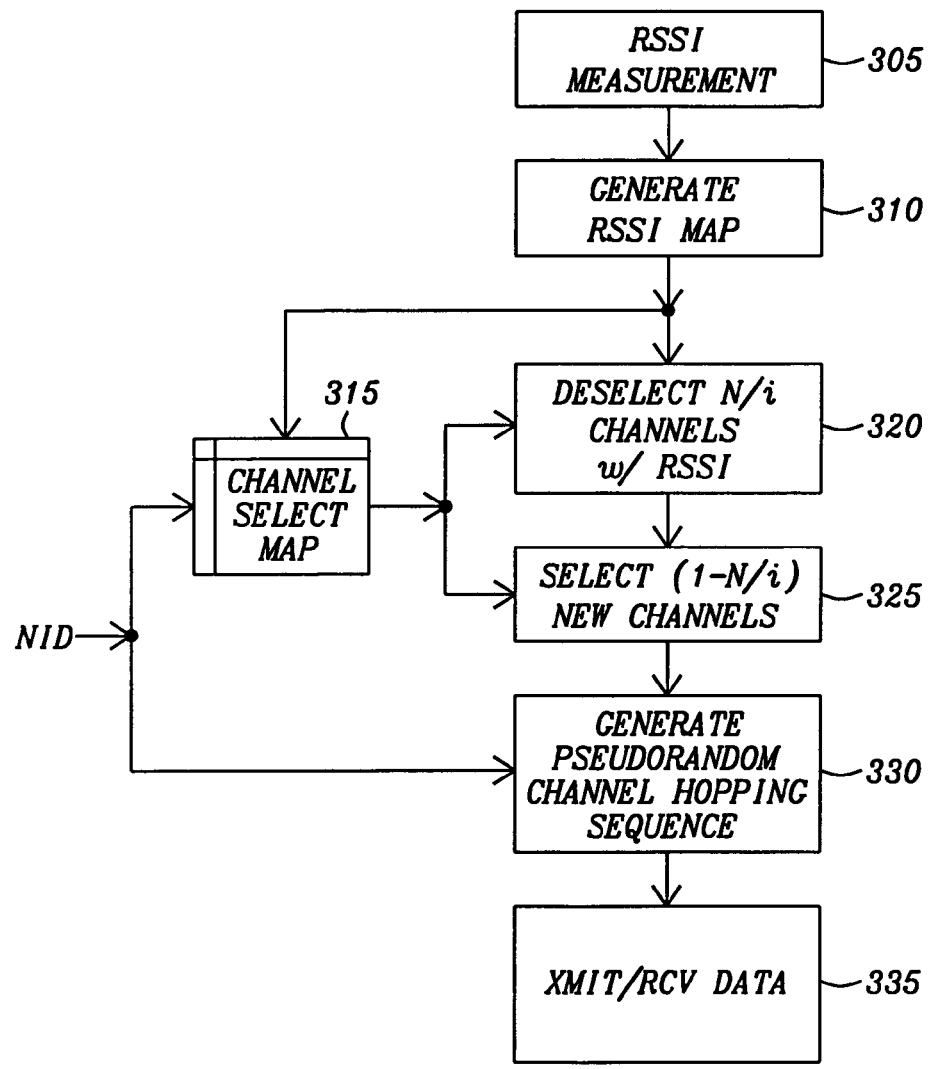
FIG. 6 is a flowchart of an embodiment of a method for selecting frequency channels of a frequency band on which a communication network operates.

FIG. 6 is a flowchart of an embodiment of a function of an apparatus or a program process executed by the CPU 102 of FIG. 2 for selecting frequency channels of a frequency band on which a communication network operates. An RSSI measurement is determined (Box 305) for each channel of the frequency band. RSSI is an indication of the interference power level being received by the antenna. Therefore, the higher the RSSI number (or less negative in some devices), the stronger the interfering signals. The channel selection map (Box 315) is generated (Box 310) from the RSSI measurements. Those channels with the highest RSSI factor are deselected (Box 320). The channels with the lowest RSSI factor are selected (Box 325) based on a mapping function pointed by the NID in the channel selection map 315. The NID is a seed for a pseudorandom generator to provide a pseudorandom sequence of numbers that is used to generate (Box 330) hopping order of the selected channels. With the appropriate hopping sequence the communication device 100 of FIG. 2 can transmit and receive (Box 335) data. By using the NID for selecting the mapping function for the selection of the channels and as the seed for the pseudorandom channel hopping sequence, each communication device 100 within the network is able to maintain the synchronization of the communication.

Figure 7:
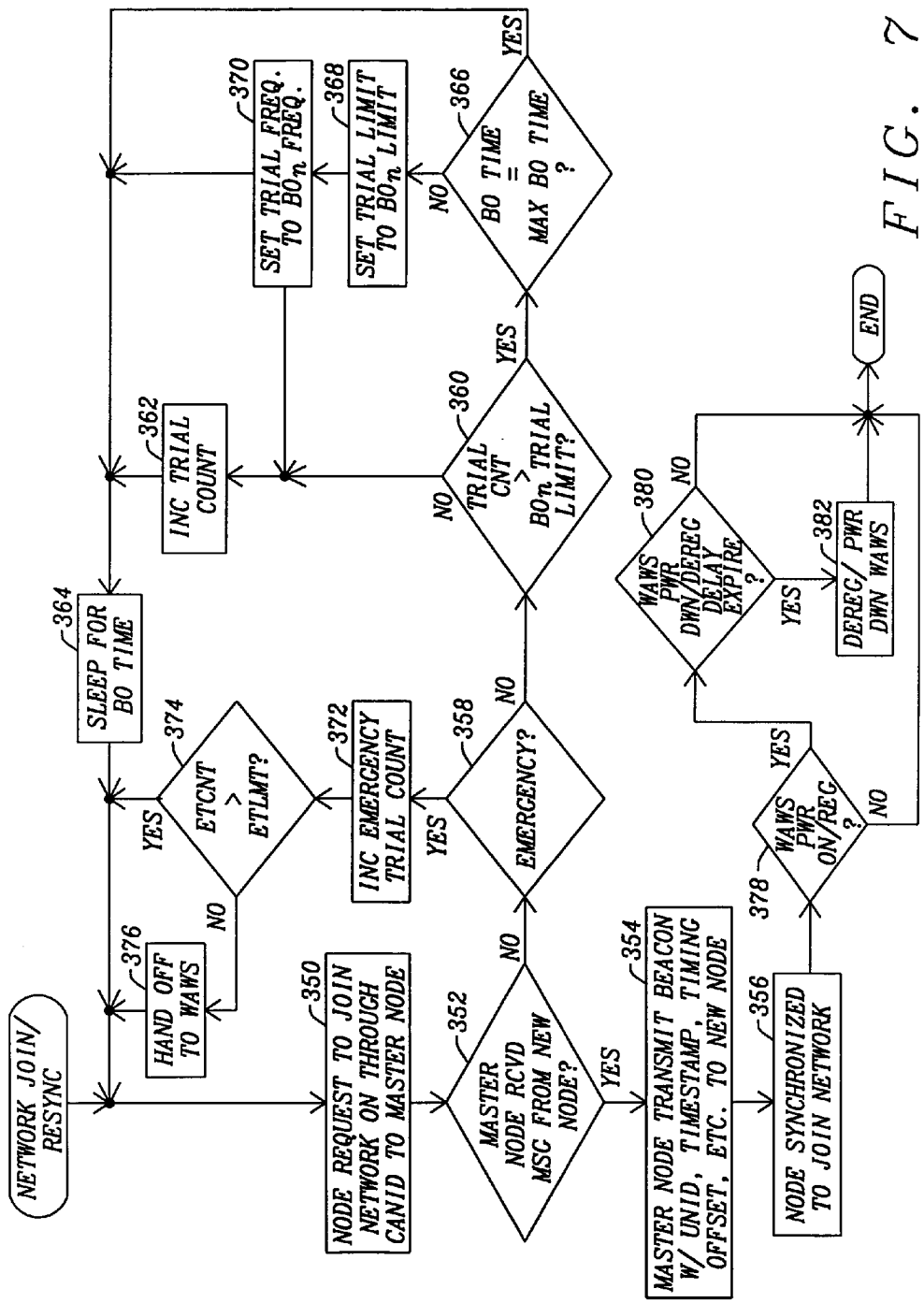
FIG. 7 is a flowchart of an embodiment of a method for a communication device to synchronize with other communication devices on a communication network of this invention.

FIG. 7 is a flowchart of an embodiment of a function of an apparatus or a program process executed by the CPU 102 of FIG. 2 for a communication device 100 to synchronize and join with other communication devices 10, 15a, 15b, 15c, and 15d, 20a and 20b, and 25a and 25b on a communication network. FIG. 8 is a plot of channel frequency versus time for a communication device 100 to join a communication network according to the method of FIG. 7. A communication device 100 requests (Box 350) to join the network as a node. The requesting device uses the CANID to address the base control communication device 10. Referring to FIG. 8, the base control communication device 10 receives or listens for a period of time on one channel 380. The requesting device transmits on each channel 382a, 382b, 382d for a shorter period of time. The base control communication device 10 will receive the transmission during the transmission by the requesting device during the transmission time 382c. If the requesting device does not correctly receive the request or another device is requesting to join the network, the base control communication device 10 will shift reception to another channel of the frequency band. The requesting device will have transmitted the join request sequentially on each channel 386a, 386b, 386d for the shorter period of time. Again the base control communication device 10 will be able to receive the transmission during the transmission time 386d.

The master base control communication device 10 determines (Box 352) if the join request message is received from the new requesting device. If the join request message is received, the master base control communication device 10 transmits (Box 354) a beacon message addressed to the requesting device containing the UNID, a timestamp, and a timing offset. Additionally, other information may be transmitted in the beacon message. The requesting device is now joined (Box 356) to the network as a network node.

If the join request message is determined (Box 352) to have not been received by the base control communication device 10, it is determined (Box 358) if the join request is the result of an emergency or urgent request. If it is not, a trial count is compared (Box 360) to a back off trail limit. The trial count is the number of time that a requesting device has tried to join a network and the back off trial limit is the maximum number of times that a requesting device tries to join the network with a given delay between trials. A requesting device will request to join with a higher frequency of requesting in a beginning time of the requesting or when there is an emergency or urgent request. As time proceeds, the frequency of the requests decreases and the time between requests increases.

If the trial count is not greater than the back off trial limit, the trial count is incremented (Box 362) and the requesting device is placed (Box 364) in a sleep mode to minimize power consumption for a back off period time. After the back off time, the requesting device requests (Box 350) to join the network as a node again.

If the base control communication device 10 is determined (Box 352) to have not received the request, the requesting device increments (Box 362) the trial counter and is placed (Box 364) in the sleep mode repetitively until the back off trial limit is reached. Then the back off time is compared (Box 366) to the maximum back off time. The maximum back off time is the maximum time between attempts to join the network. If the back off time is not the maximum back off time for the back off frequency, the trial limit is set (Box 368) to the new back trial limit and the back off frequency is set (Box 370) to the new back off frequency setting.

FIG. 9 is a plot of retry backoff time versus synchronization loss duration of a communication device 100 to conserve energy when the communication device 100 is unable to achieve synchronization with the communication network 114 of FIG. 2. When the communication device 100 has first lost synchronization, the communication device 100 attempts to rejoin the communication network 114 more quickly and the communication device 100 is placed (Box 364) in the sleep mode for a shorter time. As the duration of the loss of synchronization increases, the back off and retry time (the time the communication device 100 is placed in the sleep mode) increases. This occurs as the duration of the loss of synchronization increase until the time the communication device 100 is placed in the sleep mode asymptotically until the maximum back off retry time is reached.

The requesting device is placed in the sleep mode (Box 364) for the period time that it is to be powered down and then requesting node requests (Box 350) to join the network. If the back off time is determined (Box 366) to have reached the maximum back off time, the requesting device is placed (Box 364) in the sleep mode. Once the requesting device is determined (Box 366) to have reached the maximum back off time, the requesting device is placed in the sleep mode for this maximum back off time until, upon requesting (Box 350) to join the network, the base control communication device 10 is determined (Box 352) to have receive the request to join or that an emergency has been declared (Box 358). If there is an emergency, the requesting device increases (Box 372) the frequency of the trial request and increments the emergency trial counter. The emergency trial counter is then determined (Box 374) if it has exceeded the emergency trial limit. If the requesting device has not exceeded the emergency trial limit, the requesting device requests (Box 350) to join the network. This repeated until it is determined (Box 374) that the trial counter has exceeded the emergency trial count. At this time the requesting device is handed off to a wide area wireless system (WAWS) (Box 376) to complete the emergency request.

Figure 10:
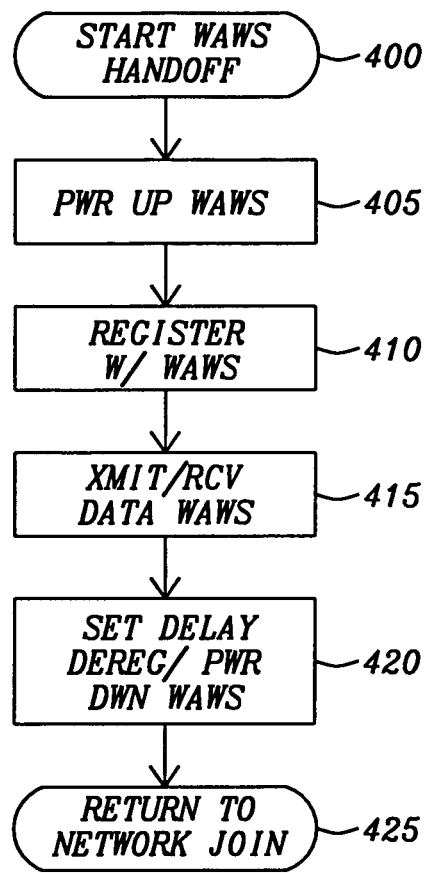
FIG. 10 is a flow chart of an embodiment of a method for controlling handoff of a communication transmission from a primary network to a secondary network.

FIG. 10 is a flow chart of an embodiment of a function of an apparatus or a program process executed by the CPU 102 of FIG. 2 of a method for controlling handoff of a communication transmission from the primary wireless network 114 of FIG. 2 to a secondary wire area wireless WAWS network 122 of FIG. 2. The method for the hand off to begins (Box 400) after the emergency trial count ETCNT has been determined (Box 374 of FIG. 7) to exceed the emergency trial count limit ETLMT. The cellular modem 118 is activated (Box 405) to a power on state. The cellular modem transmits (Box 410) a request to register with a cellular system 122. The cellular system 122 accepts and registers the communication device 100 and the communication device 100 transmits and receives (Box 415) the data to and from the WAWS (cellular system 122) and thus to the base station 10 or to emergency service groups as needed. At the completion of the transmitting and receiving (Box 415) of the data, a deregistration and power down delay is set for the communication device 100.

Returning to FIG. 7, the communication device 100 again requests (Box 350) to join the network 114 of FIG. 2. If it is determined (Box 352) that the base control communication device 10 has not received the request to join, the process for backing off for a sleep period and a retry as explained above is carried out repeated until the base control communication device 10 receives the request to join. Once it is determined (Box 352) that the base control communication device 10 has received the request to join, the base control communication device 10 transmits (Box 354) a beacon message including the NID, a timestamp for synchronizing with the base control communication device 10, a timing offset, and other communication information to maintain the communication with the devices on the wireless network 114. The timing offset describes the transmit and receive offset time for the communication device 100 from the timestamp. With this NID and the timing information, the communication device 100 joins (Box 356) the network 114. It is determined (Box 378) if the wide area wireless modem 118 is still registered and powered up. If not, the join and resynchronization process is ended. If the wide area wireless modem 118 is still registered and powered up, the communication device 100 determines (Box 380) if the deregistration and power down delay has expired, If the deregistration and power down delay time has not expired, the cellular modem 118 is kept active and the join and resynchronization process is ended. If the deregistration and power down delay time has expired, the cellular modem 118 is deactivated (Box 382) and the join and resynchronization process is ended.

Figure 11:
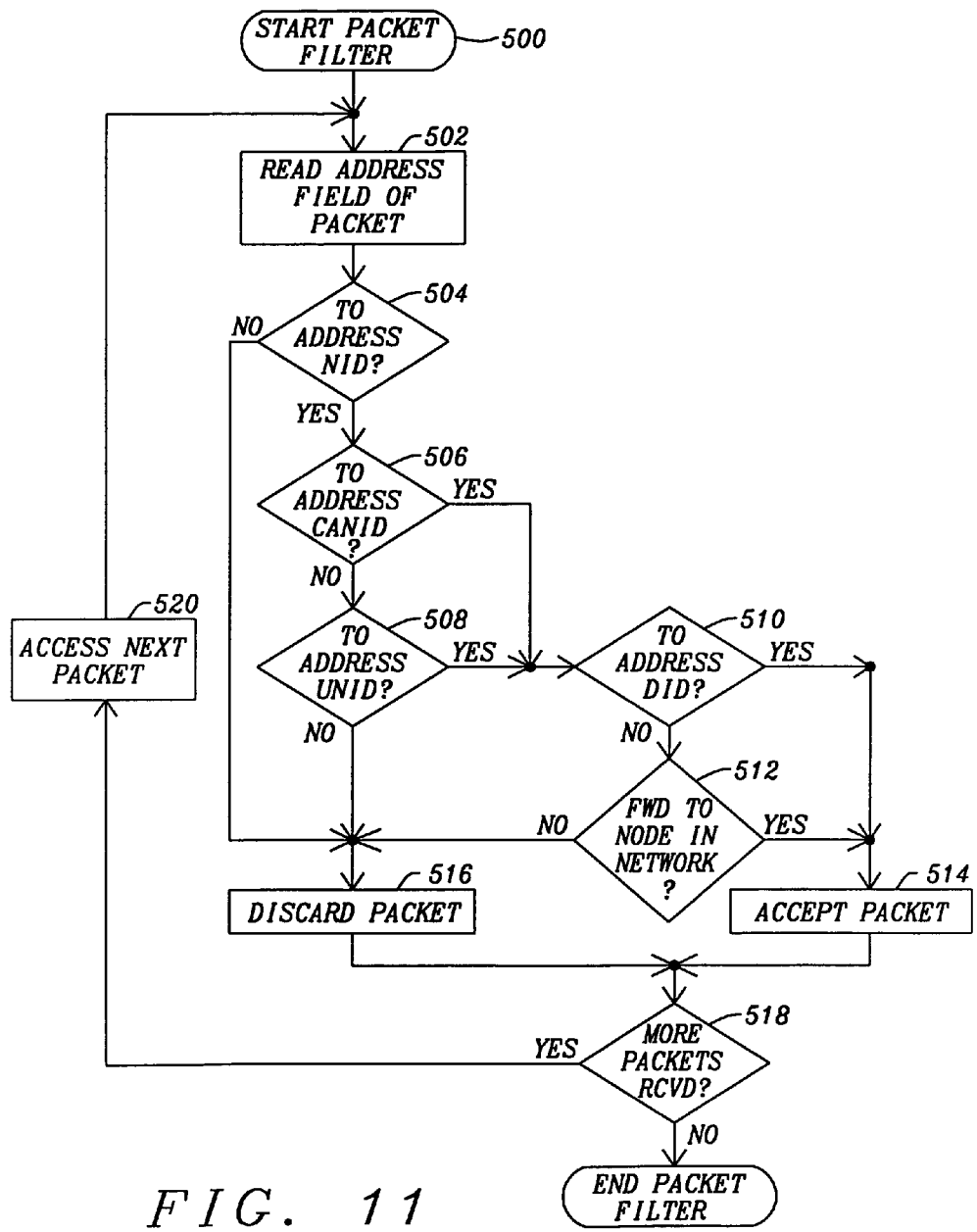
FIG. 11 is a flowchart for an embodiment of a method for packet filtering by a communication device for receiving data transmission.

FIG. 11 is a flowchart for an embodiment of a function of an apparatus or a program process executed by the CPU 102 of FIG. 2 for packet filtering by a communication device for receiving data transmission. Packet filtering is started (Box 500) by reading (Box 502) the destination address field 215 of FIG. 5. The address field 215 is examined to determine (Box 504) if the destination address is the NID. If the destination address is not the NID, the packet is discarded (Box 516). If the destination address is the NID, the destination address field 215 is determined (Box 506) if it is a CANID. If the destination address 215 is not the CANID, the destination address is examined (Box 508) to determine if the destination address 215 is the UNID. If the destination address 215 is neither the CANID nor the UNID, the received address is the discarded (Box 516). If the destination address 215 is either the CANID or the UNID, the destination is further is examined (Box 510) if the DID is the present communication device. If the destination address 215 has the CANID or UNID of the present device and the DID of the present device, the packets are accepted (Box 514) for processing. If the destination address 215 does not contain the DID of the present device, the destination is examined (Box 512) for forwarding the data packet to another node within the network. If the data packets are to be forwarded to another communication device within the network, the data packets (Box 514) are accepted for forwarding. If the data packets are not to be forwarded, the packets are discarded (Box 516). When the data packets are accepted or discarded, it is determined (Box 518) if more packets are received. If more packets are received, the next data packet is accessed (Box 520) and the destination address field is examined (Boxes 504, 506, and 508) for the NID and the CANID and UNID for acceptance (Box 514) and discarding (Box 516). The process is repeated until all the packets are received at which time is process is completed.

Figure 12:
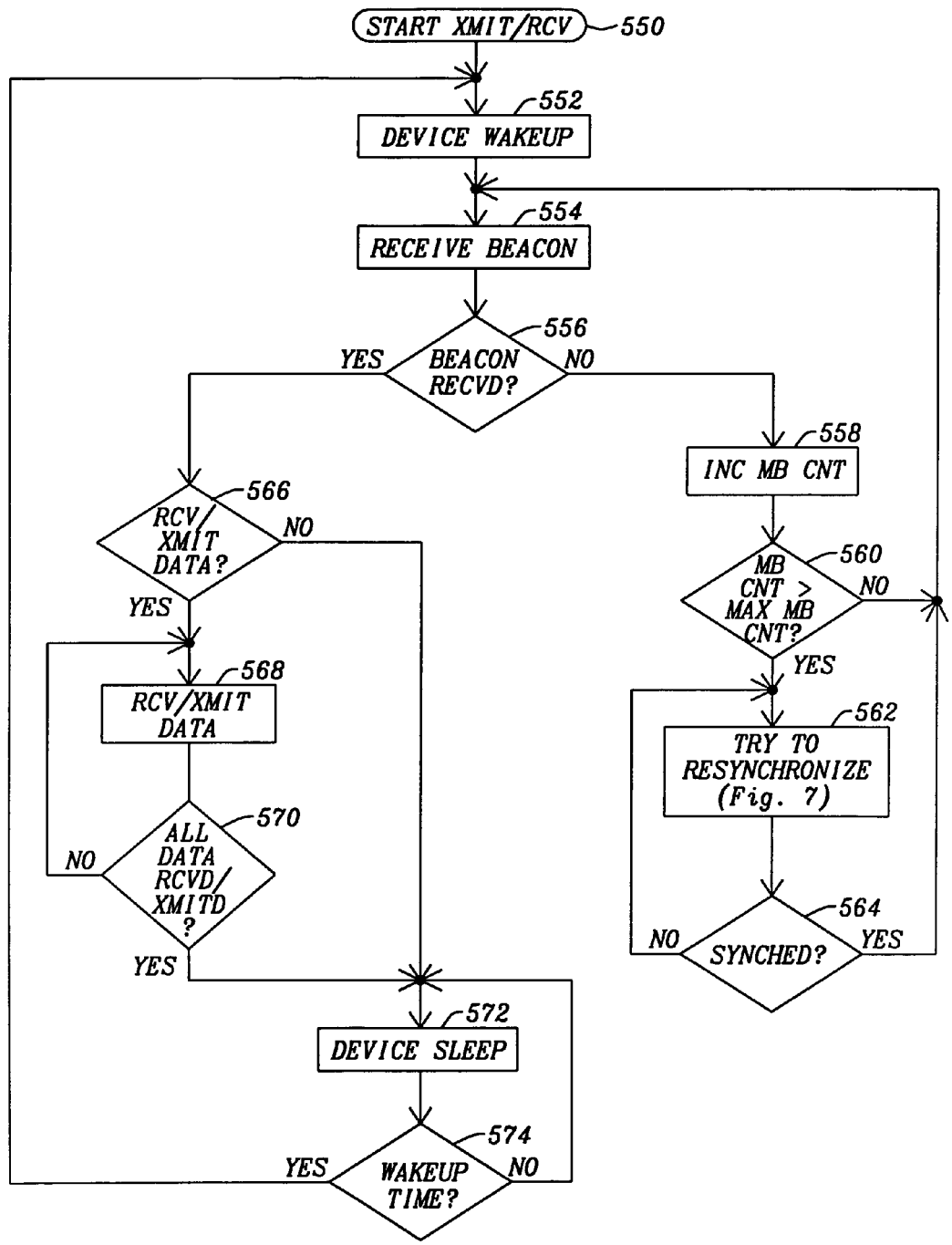
FIG. 12 is flowchart of an embodiment of a method for operating a communication device while conserving energy.

FIG. 12 is flowchart of an embodiment of a method for operating a communication device 100 of FIG. 2 while conserving energy. The communication device 100 is activated (Box 550) by a person pressing one of the switches 132, or a motion detector being activated, or a sensor 138 detecting a physical measurements such as heart rate, etc. that is out of limits. The communication device must now be waked (Box 552) from it sleep mode with the power supply control circuit 140 bringing the communication device 100 to full power. The communication device listens on one channel frequency to receive (Box 554) a transmission of a beacon message from the base control communication device 10. The communication device 100 determines (Box 556) if the beacon message is received. If it is not received, a message back off counter is initialize or incremented (Box 558) and the communication device 100 determines (Box 560) if the message back off counter has exceed a maximum message back off count. If the message back off counter has not been exceeded, the communication device 100 attempts to receive the beacon message again. In some embodiments, the communication device 100 may scan the channels of the frequency band in a process similar to that of FIG. 8, except the communication device 100 will listen for a message period and scan through the channels, while the base control communication device 10 transmits for a longer length of time on a single channel. Alternately, in other embodiments, the base control communication device 10 transmits for the shorter length of time and the communication device 100 will listen for the longer length of time on one channel.

If the message beacon is determined (Box 556) to have not been received again, the message back off counter is incremented (Box 558) and compared (Box 560) to the maximum message back off count. If the message back off count is determined (Box 560) to have not been exceeded, the communication device 100 attempts to receive (Box 554) the message beacon until the maximum message back off count is exceeded. The communication device 100 then attempts to join to resynchronize with the base control communication device 10 as described in FIG. 7. The communication device 100 determines (Box 564) if it has resynchronized and if not retries (Box 562) or as shown in FIG. 7, the communication device will attempt to join (Box 350) periodically after a relatively long sleep time (Box 364) repetitively or alternately will hand off (Box 376) the communication to the wide area wireless system in case of an emergency, as explained in FIG. 7.

When the communication device 100 is determined (Box 564) to have synchronized with the base control communication device 10 to join the communication network 114, the message beacon is attempted to be received (Box 554) and the communication device 100 determines (Box 556) that it successfully receives the message beacon. The message beacon is examined to determine (Box 566) that the base control communication device 10 has data to be transmitted to the communication device 100 or is requesting that the communication device 100 transmit data to the base control communication device 10. If the base control communication device 10 determines that the base control communication device 10 has no data to be transmitted to the communication device 100 or is requesting that the communication device 100 transmit data to the base control communication device 10, the communication device 100 is placed (Box 572) in the sleep mode.

If the base control communication device 10 determines that the base control communication device 10 has data to be transmitted to the communication device 100 or is requesting that the communication device 100 transmit data to the base control communication device 10, the data is transmitted to or received from (Box 568) the base control communication device 10. The communication device 100 determines (Box 570) if all the data has been transmitted or received. If all the data is not transmitted or received, the data is transmitted to or received from (Box 568) the base control communication device 10. When all the data is transmitted or received, the communication device 100 is placed (Box 572) in the sleep mode. The sleep mode is maintained for a period of time. It then determined (Box 574) that a wake up time has arrived, the communication device 100 wakes up (Box 552) and the process, as described above is repeated.

Figure 13:
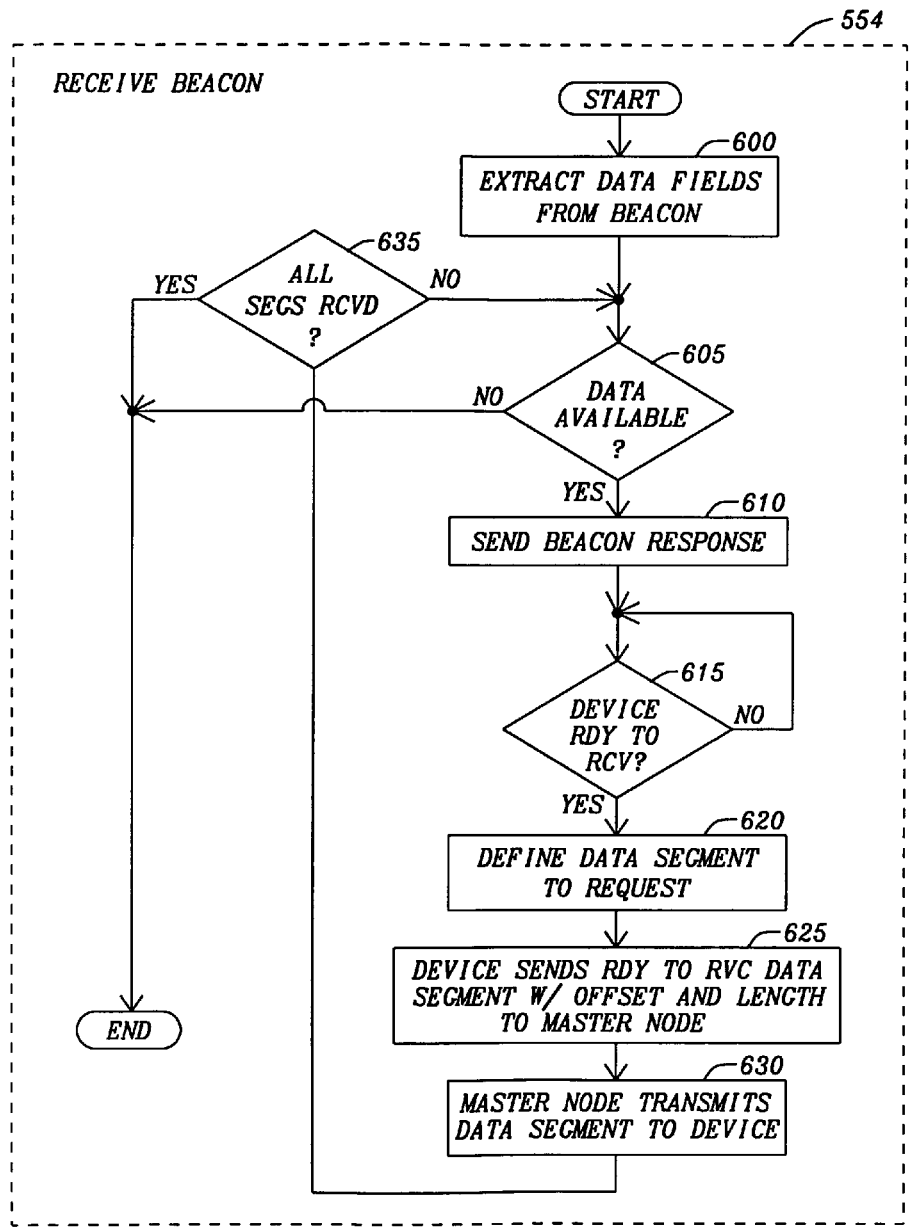
FIG. 13 is a flowchart of a method for receiving a beacon of the method of operating a communication device of FIG. 12.
Figure 14:
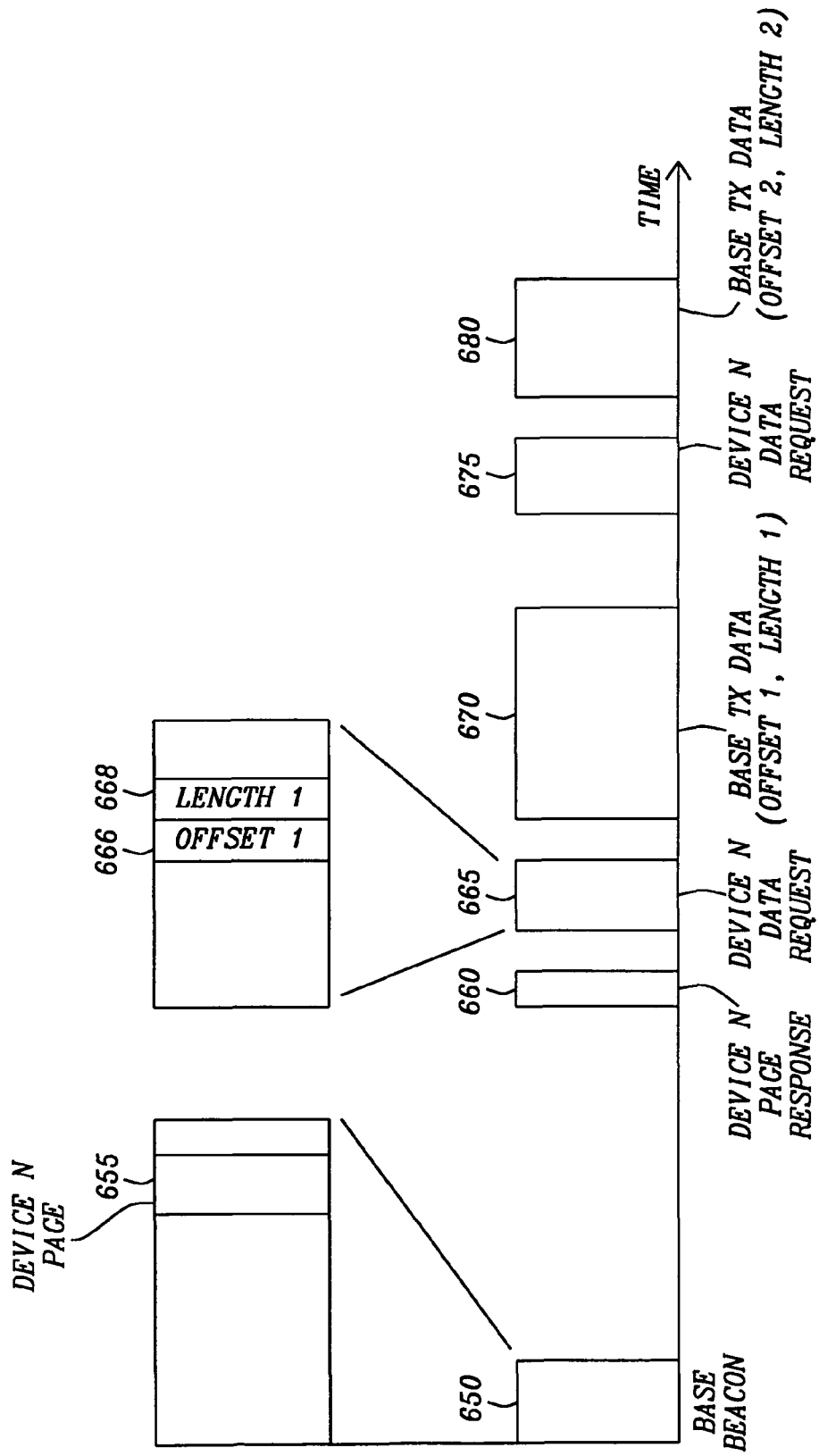
FIG. 14 is a plot of transmission time slots of an embodiment of a communication network showing the control of transmission of data from a controlling communication device to a communication device on the network.

FIG. 13 is a flowchart of a sub-apparatus or sub-program process for receiving a beacon of the embodiment of a function of an apparatus or a program process executed by the CPU 102 of FIG. 2 of operating a communication device of FIG. 12. FIG. 14 is a plot of transmission time slots of an embodiment of a communication network showing the control of transmission of data from a controlling communication device to a communication device on the network. Refer now to FIGS. 13 and 14. The receiving (Box 554) of the message beacon 650 begins by the extraction (Box 600) of the data fields from the payload 225 of the packet of FIG. 5. The communication device 100 examines (Box 605) the data field page 655 to determined if there is data to available from the base control communication device 10 to be sent to the communication device 100. If there is no data available, the beacon receiving (Box 554) is ended. If there is data available, the communication device 100 transmits (Box 610) a message beacon response 660 acknowledging that the data is available to the base control communication device 10. The communication device 100 determines (Box 615) if it is ready to receive the data. If is not ready to receive the data, the communication device 100 continues to poll to determine (Box 615) if it ready to receive the data. When the communication device 100 is ready the data, it defines (Box 620) a request 665 with the data offset location 666 and data length 668. The communication device 100 transmits (Box 625) the ready to receive message 665 to the base control communication device 10. The base control communication device 10 transmits (Box 630) the data segment 670 having the data offset 666 and length 668 to the communication device 100. The communication device 100 determines (Box 635) if all the data segments are transmitted. If not, the next available data segment 675 is requested (Box 625) with a ready to receive message and the data segments 680 are transmitted (Box 630) by the base control communication device 10 to the communication device 100. When all the segments are transmitted, the receive beacon is completed.

In some embodiments of the communication devices 100 and the base control communication device 10, the memory 104 of FIG. 2 is a relatively large nonvolatile memory device that has a relatively high latency. When the data is requested by the communication device 100, the device (base control communication device 10 or the communication device 100) having the data predictively retrieves data ahead of the actual requests. This will mask the latency of the memory 104 to improve the data transfer rate of the network 104.

While this invention has been particularly shown and described with reference to the preferred embodiments thereof, it will be understood by those skilled in the art that various changes in form and details may be made without departing from the spirit and scope of the invention.

The invention claimed is:

1. A communication device wirelessly linked to a plurality of the communication devices, the communication device comprising:
   a channel hopping control device using a unique network identification code identifying one network of one or more networks formed of the plurality of the communication devices for selecting a grouping of frequency channels within a radio frequency communication band for transmitting data between the communication devices within the one network of the one or more networks of the plurality of the communication devices;
   a pseudorandom generator connected to the channel hopping control device using the unique network identification code as a seed for generating a pseudorandom channel hopping sequence of the selected channels; and
   a synchronizing word generator that incorporates the unique network identification code or a common access identification code to generate a timing synchronizing word within a data packet for insuring synchronization of the communication devices within the one network of the one or more networks of the plurality of communication devices; and
   a packet filter for examining the header of each packet that is received by the communication device and accepts those packets with destination communication identifier fields that are designated for the communication device and when the destination communication identifier field is not designated for the communication device, the packet is discarded;
   wherein the unique network identification code is assigned to one first type communication device within the one network to allow the other communication devices of the one network to communicate only with the one first type of communication device of the one network such that the one network of the one or more networks is structured as a star network and the common access identification code allows the communication device to communicate with all communication devices of the one network such that the one network of the one or more networks is a mesh network;
   wherein the common access identification code allows new communication devices to join the one network of the one or more networks of the plurality of communication devices not knowing the unique network identification code;
   wherein the common access identification code allows certain types of communication devices within the one network of the one or more networks of the plurality of communication devices to accept communication with certain other types of communication devices within or not within the network to provide special services to the certain types of communication devices.

2. The communication device of claim 1 further comprising a received signal strength indicator circuit to determine which of the frequency channels within a radio frequency communication band are acceptable for communicating between the communication devices within the one network of the one or more networks of the plurality of communication devices.

3. The communication device of claim 1 wherein the types of communication devices comprise: a first type of communication device that is a control communication device; a second type of communication device that is a human interface device to allow a person to request and receive services from other devices on the one network of the one or more networks of the plurality of communication devices; and a third type of communication device on the one network of the one or more networks of the plurality of communication devices that is a service communication device to perform services.

4. The communication device of claim 3 wherein the performed services comprising transferring data and voice and activating functional devices connected to a third communication device.

5. The communication device of claim 4 wherein the functional devices include lights and alarms, telephones, or other electrical and/or mechanical devices.

6. The communication device of claim 3 wherein the one network of the one or more networks of the plurality of communication devices is configured as a star network and all the communication devices communicate with one first type communication device and the second and third type communication devices communicate with each other through the control communication device.

7. The communication device of claim 3 wherein the first type communication device is assigned the unique network identification code to allow each of the first type communication devices to communicate with the control communication device.

8. The communication device of claim 3 wherein the common access identification code is used by third type communication devices linked to the one network of the one or more networks of the plurality of communication devices to provide special services to requesting second type communication devices, wherein the third type communication devices accepts communications from multiple networks through the common access identification code.

9. The communication device of claim 3 wherein a device identification code is assigned uniquely to the communication device and is used in conjunction with the unique network identification code and the common access identification code to filter data packets that are addressed to the communication device.

10. The communication device of claim 3 wherein the communication device uses the common access identification code to communicate with other devices within another network of the plurality of communication devices to which the communication device is not a member to request to join the other network of the plurality of communication devices.

11. The communication device of claim 10 wherein the first type communication device of the other network of the plurality of communication devices transmits the unique network identification code, a time stamp, and a timing offset to the requesting second type communication device and the requesting second type communication device employs the unique network identification code to generate the grouping of frequency channels used by the other network of the plurality of communication devices and the frequency hopping sequence.

12. The communication device of claim 11 wherein the communication device transmits request to join messages sequentially on each of the frequency channels of the radio frequency communication band and waits for the first type communication device to receive and respond to one of the request to join messages on a channel that the first type communication device is monitoring.

13. The communication device of claim 3 wherein the data is transmitted on the one network of the one or more networks of the plurality of communication devices as data packets wherein the data packets comprise:
    an access code including:
        a preamble and a synchronizing word, and
        a header comprising a sending communication device identifier field and a destination communication identifier field.

14. The communication device of claim 13 wherein the sending communication device identifier field and the destination communication identifier field further comprise a device identification code and the unique network identification code or the common access network identification code.

15. The communication device of claim 13 further comprising a packet filter wherein the packet filter examines the header of each packet that is received by the communication device and accepts those packets with destination communication identifier fields that are designated for the communication device and when the destination communication identifier field is not designated for the communication device, the packet is discarded.

16. The communication device of claim 3 wherein the second type communication device is a wearable health management device and the control communication device is a base station controlling other wearable health management devices connected to the one network of the one or more networks of the plurality of communication devices.

17. The communication device of claim 16 wherein the third type communication device is a switching device to activate and deactivate service equipment.

18. The communication device of claim 16 wherein the service equipment is lights or emergency sounding devices.

19. The communication device of claim 16 wherein the third type communication device is a network extender device to provide a range extension for the second type communication devices that have moved beyond the range of the control communication device.

20. The communication device of claim 16 wherein the third type communication device is a telephone with a microphone and speaker for transmitting and receiving sounds.

21. The communication device of claim 20 wherein the data is encoded speech and is transmitted isochronously.

22. The communication device of claim 1 wherein the communication device requests data from another communication device and the other communication device transmits a bitmap to the requesting communication device.

23. The communication device of claim 22 wherein the data transmitting communication device retrieves the data from a high latency storage medium and predictively stages the data pending requests from the requesting communication device.

24. The communication device of claim 1 further comprising a power supply control circuit that places the communication device in a sleep mode to minimize power consumption.

25. The communication device of claim 24 wherein the power supply control circuit periodically activates the communication device to receive a beacon signal from a controlling communication device on the one network of the one or more networks of the plurality of communication devices.

26. The communication device of claim 25 wherein when the communication device does not have any data to receive, the communication is returned to the sleep mode.

27. The communication device of claim 25 wherein when the communication device is to receive the data, it transmits a ready-to-receive message to the controlling device and receives the data from the controlling communication device.

28. The communication device of claim 27 wherein the controlling communication device transmits a data offset and length and the communication device then transmits a request for portions of the data based on the data offset and length.

29. The communication device of claim 25 wherein when the communication device does not receive the beacon, it attempts to resynchronize with the one network of the one or more networks of the plurality of communication devices at an increased frequency.

30. The communication device of claim 29 wherein when the communication device is resynchronized, it receives and transmits data until a communication task is complete.

31. The communication device of claim 29 wherein when the communication device is not resynchronized, it will return to the sleep mode for a period of time and then retry to resynchronize.

32. The communication device of claim 29 wherein when the communication device is repeatedly not resynchronized, the time that the communication device is in the sleep mode is extended until the communication has not been synchronized for an unsynchronized time limit, at which time, the device will maintain the sleep mode for the unsynchronized time limit.

33. The communication device of claim 29 further comprising a network transfer circuit that transfers communication of the communication device from one network of a plurality networks of the plurality of communication devices to a second network of the plurality of networks of the plurality of communication devices when the communication device has been moved beyond the range of the one network of the one or more networks of the plurality of communication devices, wherein when the communication device is repeatedly not synchronized, the communication device will attempt to communicate with the control communication device through the second network of the plurality of networks of the plurality of communication devices that is a wide area wireless system.

34. The communication device of claim 33 wherein when the communication device becomes resynchronized to the one network of the plurality of networks of the plurality of communication devices, the communication device maintains communication with the second network of the plurality of the plurality of communication devices for a period of time to insure that the synchronization is secure.

35. The communication device of claim 34 wherein the wide area wireless system is a cellular telephone system.

36. The communication device of claim 33 further comprising a proximity monitor that determines when the communication device is in sufficiently close proximity to other communication devices that are members of the one network of the plurality of networks of the plurality of communication devices to maintain synchronization.

37. The communication device of claim 36 wherein when the communication device is not sufficiently close, the communication will assume the sleep mode.

38. The communication device of claim 37 wherein when an emergency occurs, the communication device will activate and attempt at resynchronization.

39. The communication device of claim 38 wherein when resynchronization does not occur, the communication device will activate the second network of the plurality of communication devices to communicate the emergency to the control communication device of the one network of the plurality of communication devices.

40. The communication device of claim 33 wherein the one network of the plurality of networks of the plurality of communication devices is a wireless local area network and the second network plurality of networks of the plurality of communication devices is a wide area wireless network.

41. The communication device of claim 29 further comprising a motion detector wherein when the communication device is unsynchronized and has not been in motion for a period of time, the communication device is placed in the sleep mode for an unsynchronized time limit, until the motion detector determines that the communication device has been moved.

* * * * *